(12) United States Patent
Kohn et al.

(10) Patent No.: US 8,057,928 B2
(45) Date of Patent: Nov. 15, 2011

(54) CELL CAP ASSEMBLY WITH RECESSED TERMINAL AND ENLARGED INSULATING GASKET

(75) Inventors: Scott Ira Kohn, Redwood City, CA (US); Weston Arthur Hermann, Palo Alto, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 405 days.

(21) Appl. No.: 12/456,150

(22) Filed: Jun. 12, 2009

(65) Prior Publication Data

US 2010/0136387 A1    Jun. 3, 2010

(51) Int. Cl.
*H01M 2/12* (2006.01)
(52) U.S. Cl. ............... 429/7; 429/56; 429/61; 429/178
(58) Field of Classification Search ............ 429/61, 429/7
See application file for complete search history.

(56) References Cited

U.S. PATENT DOCUMENTS

2009/0029193 A1* 1/2009 Onnerud et al. ............... 429/7
2010/0215997 A1* 8/2010 Byun et al. .................. 429/61

* cited by examiner

*Primary Examiner* — John S Maples
(74) *Attorney, Agent, or Firm* — Patent Law Office of David G. Beck

(57) ABSTRACT

A simplified cell design is provided for a battery utilizing the 18650 form-factor, the simplified cell design reducing manufacturing cost, battery weight and the risk of shorting between the battery case and the battery terminal. In the cap assembly of the disclosed battery, the safety vent element, which is recessed relative to the top of the cell case, also serves as the battery terminal. Additionally, the insulating gasket positioned between the cell case and the cap assembly is designed to cover a large portion of the outer surface of the safety vent/battery terminal.

17 Claims, 3 Drawing Sheets

CELL CAP ASSEMBLY WITH RECESSED TERMINAL AND ENLARGED INSULATING GASKET

FIELD OF THE INVENTION

The present invention relates generally to battery cells and, more particularly, to a simplified cell design.

BACKGROUND OF THE INVENTION

Batteries have been used for decades to supply power to a variety of different electrical and electro-mechanical devices. Early batteries, referred to as disposable batteries, were simply used until depleted and then discarded and replaced with one or more new batteries. A newer type of battery, referred to as a rechargeable or secondary battery, is capable of being recharged and then reused, therefore offering economic, environmental and ease-of-use benefits compared to a disposable battery.

For many applications in which multiple batteries are required, a battery pack is used in which the batteries are housed within a single or multi-piece housing. Although initially battery packs were relatively small, for example housing just a few batteries, many battery packs used today, such as those used in hybrid and electric vehicles, house tens to thousands of cells. As such, battery weight is of critical importance, as are manufacturing simplicity and cost. Additionally, due to the large number of cells required for such a sizeable battery pack, it is important that the batteries can be safely and easily transported, stored and assembled with minimal risk of battery shorting. Accordingly, what is needed is a simplified cell design that reduces manufacturing cost, weight, and the risk of shorting. The present invention provides such a design.

SUMMARY OF THE INVENTION

The present invention simplifies the design of a battery utilizing the 18650 form-factor, thereby reducing manufacturing cost and battery weight. Additionally, the disclosed design substantially reduces the risk of shorting between the battery case and the battery terminal. In at least one embodiment of the invention, a battery is provided that is comprised of a cylindrical cell case with a closed case bottom and a second end with a central open portion; an electrode assembly contained within the cell case with one electrode of the assembly electrically connected to the cell case; and a cap assembly comprised of a CID, a safety vent element and an insulating gasket interposed between an inner surface of the cell case and the safety vent element. The CID is electrically connected to the second electrode of the electrode assembly. The inner surface of the safety vent element is electrically connected to the CID and a portion of the outer surface of the safety vent element serves as the battery terminal. The insulating gasket includes an aperture that defines the battery terminal. The CID may be comprised of aluminum. The insulating gasket may be comprised of a first insulating member and a second insulating member, for example an insulating ring-shaped member and an insulating disk-shaped member. The safety vent element may be comprised of aluminum. The CID may be comprised of an upper member and a lower member, wherein the upper member is electrically connected to the safety vent element, for example via a weld, and the lower member is electrically connected to the second electrode of the electrode assembly, for example via a weld. The insulating gasket may cover at least 50 percent of the outer surface of the safety vent element; alternately at least 75 percent; alternately at least 90 percent; alternately at least 95 percent. The insulating gasket may be comprised of a material selected from the group of materials consisting of synthetic polymers, synthetic fluoropolymers or polyimides.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different rechargeable cell chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. It should be understood that identical element symbols used on multiple figures refer to the same component, or components of equal functionality. Additionally, the accompanying figures are only meant to illustrate, not limit, the scope of the invention and should not be considered to be to scale.

Figure 1:
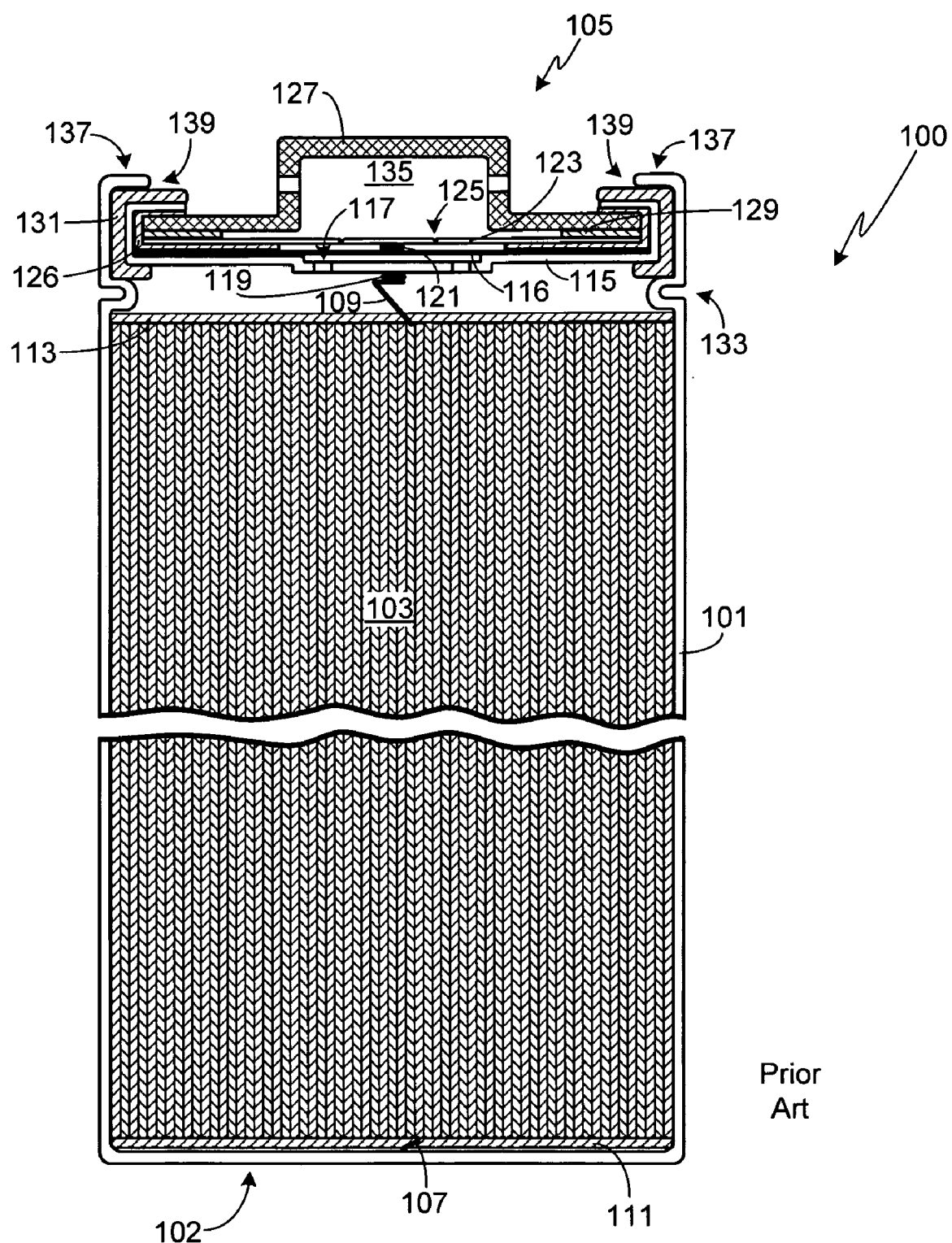
FIG. 1 is a cross-sectional view of a conventional cell and cap assembly commonly used with lithium ion batteries employing the 18650 form-factor.

FIG. 1 is a cross-sectional view of a conventional cell and cap assembly commonly used with lithium ion batteries employing the 18650 form-factor. Battery 100 includes a cylindrical case 101, an electrode assembly 103, and a cap assembly 105. Case 101 is typically made of a metal, such as nickel-plated steel, that has been selected such that it will not react with the battery materials, e.g., the electrolyte, electrode assembly, etc. For an 18650 cell, case 101 is often referred to as a can as it is comprised of a cylinder and an integrated, i.e., seamless, bottom surface 102. Electrode assembly 103 is comprised of an anode sheet, a cathode sheet and an interposed separator, wound together in a spiral pattern often referred to as a 'jelly-roll'. An anode electrode tab 107 connects the anode electrode of the wound electrode assembly to the negative terminal which, for an 18650 cell, is case 101. A cathode tab 109 connects the cathode electrode of the wound electrode assembly to the positive terminal via cap assembly 105. Typically battery 100 also includes a pair of insulators 111/113 located on either end of electrode assembly 103 to avoid short circuits between assembly 103 and case 101.

In a conventional cell, cap assembly 105 is a relatively complex assembly that includes multiple safety mechanisms. In cell 100, tab 109 is connected to assembly 105 via a current interrupt device (CID). The purpose of the CID is to break the electrical connection between the electrode assembly and the positive terminal if the pressure within the cell exceeds a predetermined level. Typically such a state of over pressure is indicative of the cell temperature increasing beyond the intended operating range of the cell, for example due to an extremely high external temperature or due to a failure within the battery or charging system. Although other CID configurations are known, in the illustrated cell the CID is comprised of a lower member 115 and an upper member 116. Members 115 and 116 are electrically connected, for example via crimping along their periphery. Lower member 115 includes multiple openings 117, thus insuring that any pressure changes within case 101 are immediately transmitted to upper CID member 116. The central region of upper CID member 116 is scored (not visible in FIG. 1) so that when the pressure within the cell exceeds the predetermined level, the scored portion of member 116 breaks free, thereby disrupting the continuity between the electrode assembly 103 and the battery terminal.

Under normal pressure conditions, lower CID member 115 is coupled by a weld 119 to electrode tab 109 and upper CID member 116 is coupled by a weld 121 to safety vent 123. In addition to disrupting the electrical connection to the electrode assembly during an over pressure event, the CID in conjunction with safety vent 123 are designed to allow the gas to escape the cell in a somewhat controlled manner. Safety vent 123 may include scoring 125 to promote the vent rupturing in the event of over pressure.

The periphery of CID members 115/116 are electrically isolated from the periphery of safety vent 123 by an insulating gasket 126. As a consequence, the only electrical connection between CID members 115/116 and safety vent 123 is through weld 121.

Safety vent 123 is coupled to battery terminal 127 via a positive temperature coefficient (PTC) current limiting element 129. PTC 129 is designed such that its resistance becomes very high when the current density exceeds a predetermined level, thereby limiting short circuit current flow. Cap assembly 105 further includes a second insulating gasket 131 that insulates the electrically conductive elements of the cap assembly from case 101. Cap assembly 105 is held in place within case 101 using crimped region 133.

Elements 115, 116 and 123 must be fabricated from a material that does not react with the electrolyte used in the electrode assembly. Accordingly, for a conventional lithium ion cell, these elements cannot be fabricated from steel. Typically they are fabricated from aluminum. In contrast, terminal 127 is generally fabricated from steel, thus allowing resistance welding to be used to attach a conductor to the terminal.

Figure 2:
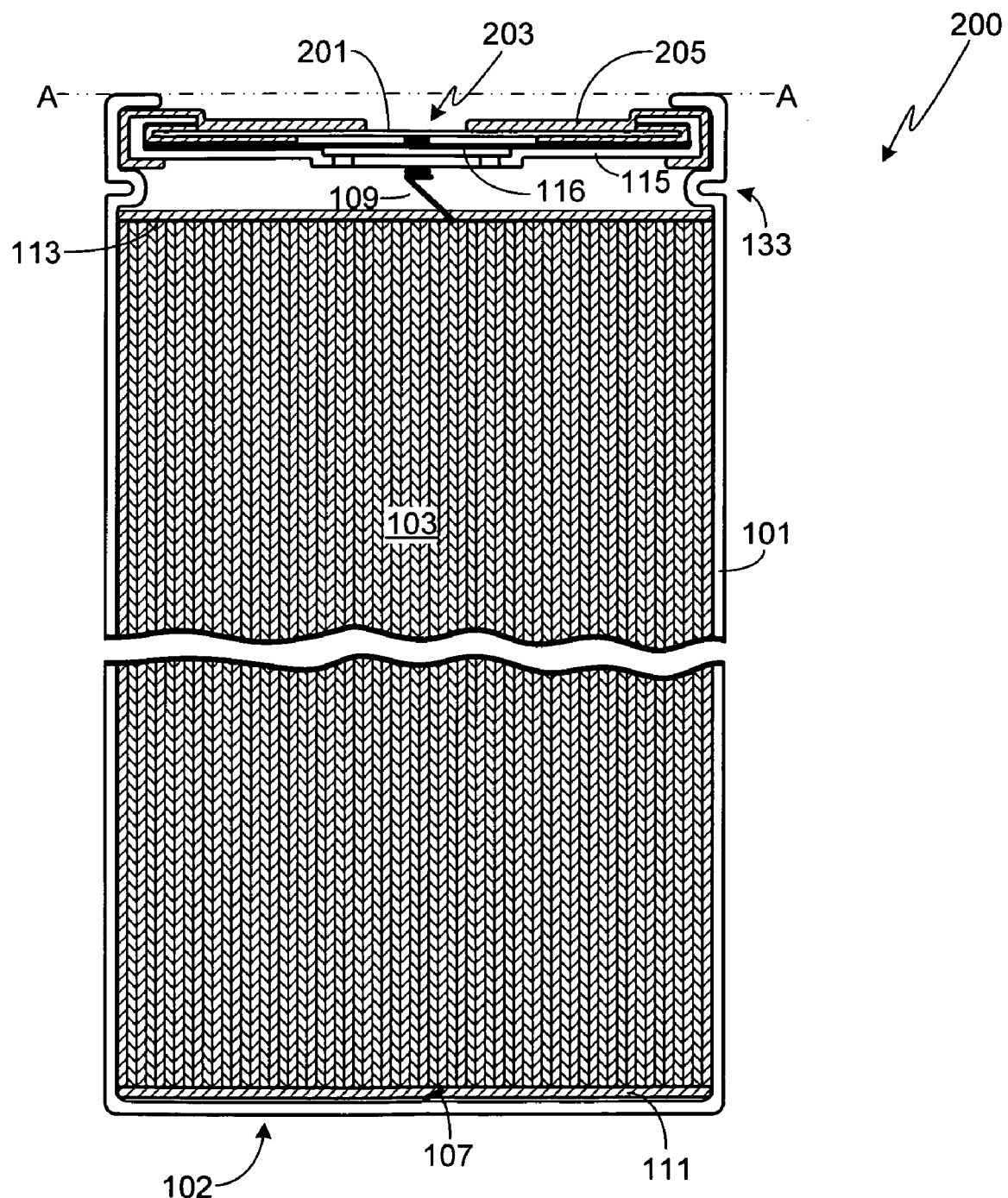
FIG. 2 is a cross-sectional view of a cell and cap assembly in accordance with the invention.

FIG. 2 is a cross-sectional view of a cell 200 in accordance with the invention. As shown, steel terminal cap 127 is eliminated, resulting in the uppermost element 201 of the assembly serving as both the cell terminal and the safety vent. Accordingly, electrical connection to the cap assembly is via the central portion 203 of cell terminal face 201. As shown, terminal region 203 is defined by insulating gasket 205, gasket 205 extending much further towards the central axis of the battery than in a conventional cell. Preferably gasket 205 covers at least 50 percent of the surface area of the upper surface of element 201, more preferably covers at least 75 percent of the surface area of the upper surface of element 201, still more preferably covers at least 90 percent of the surface area of the upper surface of element 201, and yet still more preferably covers at least 95 percent of the surface area of the upper surface of element 201. Preferably terminal 201, including region 203, is recessed relative to the uppermost plane of cell 200 (i.e., plane A-A) as shown. Exemplary materials for the fabrication of insulating gasket 205 include synthetic polymers, synthetic fluoropolymers, and polyimides.

Figure 3:
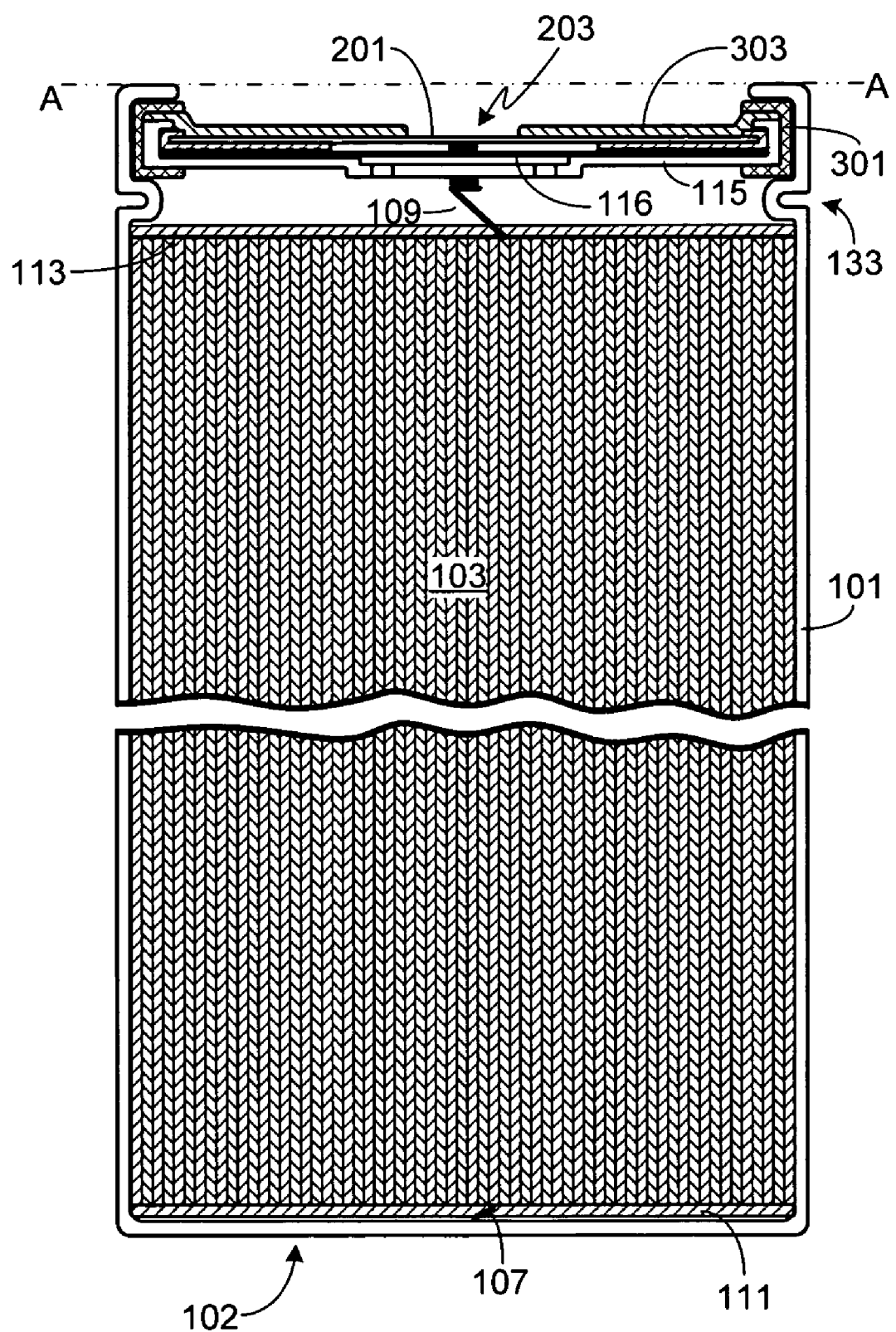
FIG. 3 is a cross-sectional view of a cell and cap assembly in accordance with an alternate embodiment of the invention.

If desired, gasket 205 may be comprised of two pieces. For example, in the embodiment illustrated in FIG. 3, gasket 205 is replaced by a first gasket member 301 that isolates the edges of the terminal assembly and a second gasket member 303 that covers the upper surface of terminal 201, except for region 203.

A conventional cell is designed to allow resistance welding to be used to weld a contact/tab to the battery. Since resistance welding is facilitated by metals with poor electrical conductivity, the terminal (e.g., terminal 127) in a conventional cell is typically fabricated from steel. Additionally, since resistance welding creates a localized hot spot where the material melts to form the junction with the contact/tab, terminal 127 is raised relative to the surface of safety vent 123 and preferably includes an air gap 135, thereby preventing damage to the sealed cap assembly. In contrast, terminal 201 of the present cell is designed for use with ultrasonic welding, not resistance welding. Since ultrasonic welding does not create a localized melt, the terminal does not need to be raised as with the prior assembly. Furthermore, as aluminum works quite well with ultrasonic welding, the same element can be used for both the terminal and the safety vent, thereby decreasing battery weight.

In the prior art cell, and as previously described, a PTC element 129 is interposed between terminal 127 and safety vent 123. Although the present invention can include an integrated PTC element, the inventors have found that it is preferably to eliminate the PTC element from the battery, as shown in FIG. 2, thereby reducing battery complexity, weight and cost. The protection afforded by PTC 129 can then be included within the battery pack where its inclusion does not jeopardize the battery seal.

Due to the use of a raised terminal 127, a conventional cell is prone to shorting between the upper edge 137 of case 101 and terminal 127, for example by inadvertently contacting the end of the battery to another battery's case, a metal battery pack component, tooling, or other electrically conductive objects during handling, storage and/or installation. In contrast, the terminal of the presently disclosed cell is recessed as shown in FIG. 2, thereby substantially reducing the risk of shorting. The risk of shorting in the present cell is further reduced by expanding the area covered by the insulator, e.g., insulator 205 or insulator 303, as previously described.

The inventors have found that an additional benefit of the present invention is a reduction in condensation and corrosion at the upper edge 139 of case 101.

Although the preferred embodiment of the invention is utilized with a cell using the 18650 form-factor, it will be appreciated that the invention can be used with other cell designs, shapes and configurations.

As will be understood by those familiar with the art, the present invention may be embodied in other specific forms without departing from the spirit or essential characteristics thereof.

What is claimed is:
1. A battery having an 18650 form-factor, the battery comprising:
 a cell case having a cylindrical outer surface, a first end and a second end, wherein said first end is closed by a cell case bottom, and wherein said second end is comprised of a central open portion;
 an electrode assembly contained within said cell case, wherein a first electrode of said electrode assembly is electrically connected to said cell case; and a cap assembly mounted to said cell case, said cap assembly closing said central open portion of said second end of said cell case, wherein said cap assembly further comprises:
  a current interrupt device (CID), wherein said CID is electrically isolated from said cell case and electrically connected to a second electrode of said electrode assembly;
  a safety vent element electrically isolated from said cell case, wherein an inner surface of said safety vent element is electrically connected to said CID, wherein a portion of an outer surface of said safety vent element serves as a battery terminal for said battery, and wherein said outer surface of said safety vent element is recessed relative to an outermost edge portion of said second end of said cell case; and
  an insulating gasket interposed between an inner surface of said cell case and said safety vent element, wherein said insulating gasket includes an aperture, and wherein said aperture defines said battery terminal.

2. The battery of claim 1, wherein said insulating gasket is comprised of a first insulating member and a second insulating member, wherein said first insulating member covers at least a portion of said outer surface of said safety vent element and includes said aperture, and wherein said second insulating member is interposed between said inner surface of said cell case and a peripheral portion of said CID.

3. The battery of claim 1, wherein said CID and said safety vent element are comprised of an aluminum material.

4. The battery of claim 1, wherein said cap assembly does not include a positive temperature coefficient (PTC) current limiting element.

5. The battery of claim 1, wherein said insulating gasket covers at least 50 percent of said outer surface of said safety vent element.

6. The battery of claim 1, wherein said insulating gasket covers at least 75 percent of said outer surface of said safety vent element.

7. The battery of claim 1, wherein said insulating gasket covers at least 90 percent of said outer surface of said safety vent element.

8. The battery of claim 1, wherein said insulating gasket covers at least 95 percent of said outer surface of said safety vent element.

9. The battery of claim 1, wherein said outer surface of said safety vent element is substantially planar.

10. The battery of claim 1, wherein said insulating gasket is comprised of a material selected from the group of materials consisting of synthetic polymers, synthetic fluoropolymers, and polyimides.

11. The battery of claim 1, wherein said CID is comprised of an upper member and a lower member, wherein said upper member is electrically connected to said inner surface of said safety vent element, and wherein said lower member is electrically connected to said second electrode of said electrode assembly.

12. The battery of claim 11, wherein said upper member of said CID is electrically connected to said inner surface of said safety vent element via a first weld, and wherein said lower member of said CID is electrically connected to said second electrode of said electrode assembly via a second weld.

13. The battery of claim 1, wherein said battery is a lithium ion battery.

14. A battery having an 18650 form-factor, the battery comprising:
  a cylindrical cell case with a first end and a second end, wherein said first end is closed by a cell case bottom, and wherein said second end is comprised of a central open portion;
  an electrode assembly contained within said cell case, wherein a first electrode of said electrode assembly is electrically connected to said cell case; and
  a cap assembly mounted within said cell case, said cap assembly closing said central open portion of said second end of said cell case, wherein said cap assembly does not include a positive temperature coefficient (PTC) current limiting element, and wherein said cap assembly further comprises:
    a current interrupt device (CID), wherein said CID is fabricated from aluminum and is electrically isolated from said cell case and electrically connected to a second electrode of said electrode assembly;
    a safety vent element fabricated from aluminum and electrically isolated from said cell case, wherein an inner surface of said safety vent element is electrically connected to said CID, wherein a portion of an outer surface of said safety vent element serves as a battery terminal for said battery, and wherein said outer surface of said safety vent element is recessed relative to an outermost edge portion of said second end of said cell case; and
    an insulating gasket interposed between an inner surface of said cell case and said safety vent element, wherein said insulating gasket covers at least 90 percent of said outer surface of said safety vent element, wherein said insulating gasket includes an aperture, and wherein said aperture defines said battery terminal.

15. The battery of claim 14, wherein said insulating gasket is comprised of a first insulating member and a second insulating member, wherein said first insulating member covers at least a portion of said outer surface of said safety vent element and includes said aperture, and wherein said second insulating member is interposed between said inner surface of said cell case and a peripheral portion of said CID.

16. The battery of claim 14, wherein said CID is comprised of an upper member and a lower member, wherein said upper member is electrically connected to said inner surface of said safety vent element, and wherein said lower member is electrically connected to said second electrode of said electrode assembly.

17. The battery of claim 16, wherein said upper member of said CID is electrically connected to said inner surface of said safety vent element via a first weld, and wherein said lower member of said CID is electrically connected to said second electrode of said electrode assembly via a second weld.

* * * * *